Nov. 18, 1930.    M. TAYLOR    1,782,106
MEAN TEMPERATURE INDICATOR
Filed June 24, 1929
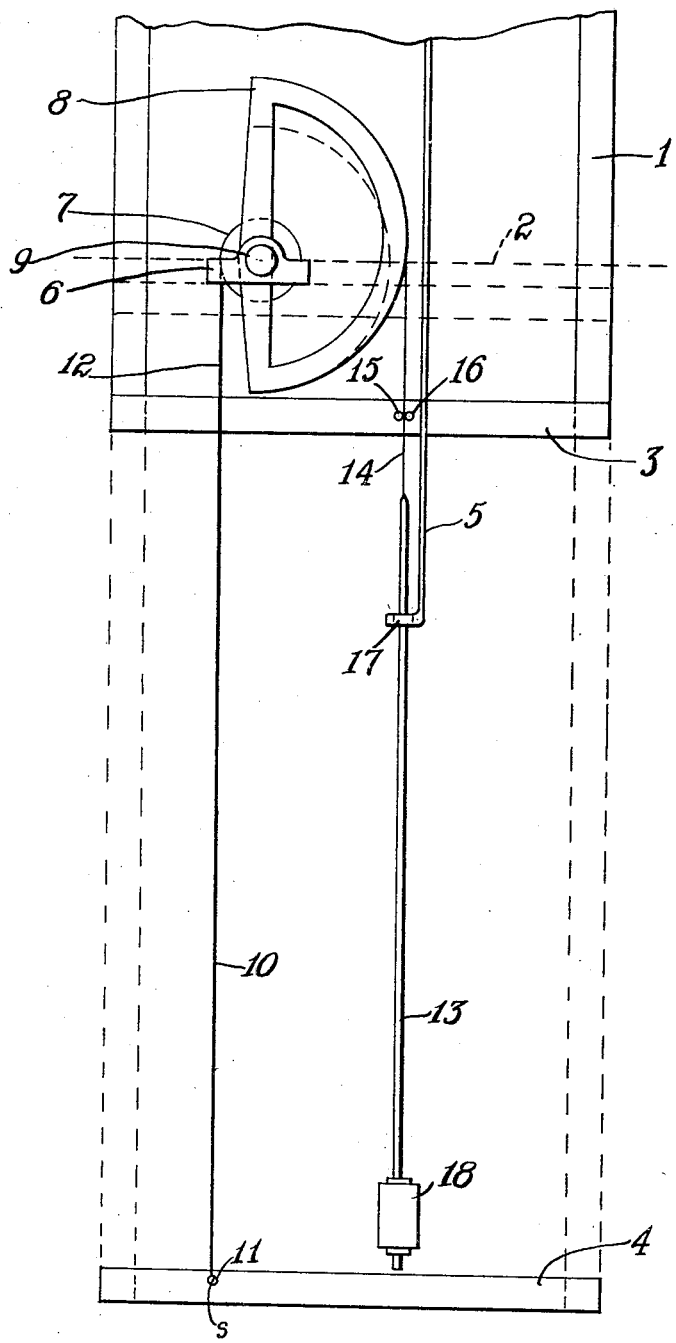
INVENTOR
Marshall Taylor
by William B. Jaspert.
Attorney.

Patented Nov. 18, 1930

1,782,106

UNITED STATES PATENT OFFICE

MARSHALL TAYLOR, OF WILKINSBURG, PENNSYLVANIA

MEAN-TEMPERATURE INDICATOR

Application filed June 24, 1929. Serial No. 373,135.

This invention relates to measuring devices, more particularly to apparatus for measuring mean temperatures over a given period of time.

The invention is predicated upon the well known fact that mechanical devices for measuring time accurately must be compensated for variations by thermal expansion of the metals as affected by the temperature of the mechanism.

Thus, where one of two pendulum clocks, otherwise alike, and running in the same temperatures, has its pendulum compensated to keep exact time, while the pendulum of the other clock is not compensated, the clocks do not keep together and the discrepancy in the time indicated is an index of the average temperature in which the clocks were running.

To interpret this index in terms of temperature, it is necessary to establish the standard temperature, that is, the temperature at which the clocks run at the same rate with this standard temperature determined, and the discrepancy in indicated times measured, it is possible to deduce the average temperature from the temperature expansion coefficients of the metals and the laws of the pendulum. However, the discrepancies between two such clocks under ordinary conditions is small, too small for convenient measurement in terms of temperature.

units of a convenient size to measure, the average temperature for a given period of time can be readily determined.

Assuming 40° to be the standard temperature at which two clocks keep together, and the uncompensated clock beating seconds at 40° varies one beat per hour for each degree of temperature variation from 40° ± or if it beats one-half seconds at a standard temperature of 0° and varies 10 beats per day for each degree of temperature variation ±, we have conveniently measurable and easily translatable terms.

While there are both mathematical and mechanical reasons for thinking that one-half second oscillations and upper limit temperature standards would be best in practice, yet for simplicity in description, let us assume a standard temperature of 40° Fahrenheit, a clock that beats seconds or 3600 oscillations per hour and whose pendulum is changed in length for each degree of temperature sufficiently to affect its rate one oscillation each hour, now if we assume a temperature range of 40°±100°, then we have the limits of the pendulum 3500 to 3700 per hour.

As the time of oscillation of pendulums varies directly with the square root of their length, and their rate of oscillation varies inversely with the square root of their length, we have the following values for the requirements based on the normal pendulum length of 39.14″ and 3600 oscillations per hour:

| Relative length of square root | $\frac{3600}{3700}$ | $\frac{3600}{3699}$ | $\frac{3600}{3602}$ | $\frac{3600}{3601}$ | $\frac{3600}{3600}$ | $\frac{3600}{3599}$ | $\frac{3600}{3598}$ | $\frac{3600}{3501}$ | $\frac{3600}{3500}$ |
|---|---|---|---|---|---|---|---|---|---|
| Temperature | −60° | −59° | 38° | 39° | 40° | 41° | 42° | 139° | 140° |
| Oscillations per hour | 3700 | 3699 | 3602 | 3601 | 3600 | 3599 | 3598 | 3501 | 3500 |
| Square-root length | 6.0872 | 6.0887 | 6.2527 | 6.2544 | 6.2561 | 6.2579 | 6.2596 | 6.4331 | 6.4348 |
| Actual length | 37.0532 | 37.0723 | 39.0965 | 39.1182 | 39.1400 | 39.1617 | 39.1885 | 41.3848 | 41.4084 |

Accordingly, it is among the objects of this invention to provide simple and efficient means for enlarging or magnifying the discrepancy of a time measuring device to a degree where it is convenient to measure and translate into terms of temperature.

By employing the commonly known units of seconds, minutes, hours or days, for time, and degrees Fahrenheit for temperature, as The pendulum then will vary in length from 37.053″ to 41.408″ or .019643″ per oscillation at short and cold end to .023625″ per oscillation at long and warm end of the temperature range. Obviously, to accomplish this progressive variation in length of pendulum by taking up on a circumference, involves a corresponding progression of either the unit of angle through which the circumference is rotated, or the radius of the circumference, that is, by a cam.

However, both methods amount to the same thing, for if the cam axis is rotated uniformly to a temperature coefficient through units of angle, or if this temperature coefficient is applied directly to the cam, and units of circumference are rotated on a circumference of varying radius, thus giving varying angular rotation of axis, the same thing is accomplished and the formula for the cam involved is the same in both cases:

(a). Let O = the number of oscillations per unit of time of standard pendulum or 3600 per hour.

(b). Let L = length of standard pendulum = 39.14″.

(c). Let $n, n_1, n_2$, etc. = number of oscillations per unit of time, by which a second pendulum differs from O, + when shorter − when longer.

(d). Let V = 360, divided by unit of angle selected for changing pendulum one oscillation per hour or unit of time.

(e). Let R = radius of cam.

(f). Let P = pendulum of (a).

(g). Let $P \pm n$ = pendulum of (c).

(h). Let W = length of control or expansion element.

(k). Let T = temperature coefficient of expansion element, 1° F.

Then from line 1 in table of values $$\frac{O}{O} \text{ and } \frac{O}{O \pm n}$$

are the relative lengths of the square root of P and $P \pm n$; therefore, while O and $O \pm n$ are the rates of P and $P \pm n$, $$\left(\frac{O}{O}\right)^2 L$$

and $$\left(\frac{O}{O \pm n}\right)^2 L$$

are the lengths of P and $P \pm c$.

As the radius for any point on the circumference of this cam has no value other than a value assigned either directly or through V, (d) and as the radius for any assigned arc can be only an average for that arc, from (d) we have $$\frac{2\pi R}{V} = P - (P \pm n)$$

that is, $$R = V \frac{[P - (P \pm n)]}{2\pi}$$

is the value of R for the middle of arc included between P and $P \pm n$, where Rn corresponds to arc $n$ included between immediately adjacent pendulum $P \pm n$ and $P \pm n_2$.

A cam whose radii corresponds to the symbols above used develops a circumference which when uniformly rotated through equal units of angle, takes up the variations of the pendulum, and any cam doing this has the above relative values, $$R = V \frac{[P - (P \pm n)]}{2\pi}$$

The requirements are that this cam is to be rotated through one unit of angle for each degree variation in temperature. This is accomplished by a control element fixed at one end with the other end passing around and fastened to the cam axis, in opposition to pendulum on the cam. As the temperature rises this control becomes longer, thus letting down the bob by its own weight.

As temperature lowers, contraction of W shortens the pendulum. The relation of this control element to the cam is expressed in the following equation:

Radius of axis $$\frac{VTW}{2\pi}$$

The preceding description is of the theoretical cam and pendulum. In practice, certain corrections for mechanism and temperature coefficients of materials are required.

The device employed for measuring the average temperature in accordance with the foregoing description may be of the nature illustrated in the accompanying drawing in which the single figure is a diagrammatic view illustrating the cam and pendulum mechanism.

In the drawing 1 generally designates a clock frame having rigid and nonvariable transverse braces or supports 2, 3 and 4. The dial portion of the clock and its operating mechanism is not illustrated. The only portion of the clock essential to a full understanding of the invention being the escapement lever 5 which is illustrated as extending along the vertical axis of the clock frame work. Mounted on the transverse support 2 is a journal block 6 in which a drum 7 and a cam 8 are journalled by means of a shaft 9 the drum and cam being integrally formed to be rotatable together. A wire element 10 is rigidly secured at 11, this point being fixed against any movement whatsoever with reference to the axis of cam 8. The wire 10 is flattened in the form of a thin band at 12, this band enveloping the drum 7.

A pendulum rod 13 flattened to a thin band at 14 is secured to and adapted to contact with the surface of cam 8 and is curbed in its movement by a pair of pins 15 and 16. The pendulum rod 13 passes through an opening in the offset portion 17 of the escapement lever of the clock. Secured to the lower extremity of rod 13 is a pendulum bob 18.

In operation the mechanism functions as follows: The escapement lever 5 of the clock is actuated by movement of pendulum rod 13 which movement varies with its length. The surface of cam 8 varies from a true circle which is shown in dotted line, so that by angular movement of the cam the length of the pendulum varies in accordance with the change in radii from the point of tangency at which the band portion 14 of the pendulum rod leaves the cam. Such angular movement of the cam is in response to any variation in length of wire 10. Since wire 10 is fixed at 11 and is under uniform tension by the weight of pendulum bob 18 any variation in the length of the wire due to thermal expansion or contraction will cause a corresponding angular motion of cam 8, resulting in a change in length of the pendulum.

As previously explained herein, the discrepancy produced by change in length of pendulum will be indicated on the clock dial as loss of time in comparison with a so-called standard time clock, and such loss of time may be readily interpreted as mean or average temperature for any period desired. By such mechanism it is possible for the Weather Bureau to determine average temperature for the day or seasons of the year.

The clock mechanism may be provided with one or more dials showing a lapsed time, one dial showing days, another hours and another minutes or seconds, although one dial showing 1,000,000 seconds is sufficient.

Comparison of the time indicated on these dials with the time indicated by the time clock can thus be quickly read, and the variation since previous reading, or since the clocks were "set" together, can thus be easily translated as degrees of temperature.

For example, let us suppose that exactly 100 hours had elapsed since previous reading and that temperature clock had lost 840 seconds in that time. Then as each second is equivalent to 1° per hour $$\frac{840}{100} = 8.40°;$$

added to standard 40° = 48.4°; the mean temperature for this 100 hours. Again, suppose that during June temperature clock lost six hours, 32 minutes and 24 seconds, that is, $$23544 \text{ seconds in } 720 \text{ hours} = \frac{23544}{720} = 32.7,$$

or 32.7 + 40 = 72.7° as mean temperature of June.

I claim:

1. A temperature measuring device comprising the combination with the escapement lever of a clock mechanism, of means responsive to temperature changes for varying the rate of such mechanism, said means being adapted to exaggerate the variations in the rate of the clock mechanism.

2. A temperature measuring device comprising the combination with the escapement lever of a pendulum clock mechanism, of means responsive to temperature changes for varying the length of the pendulum.

3. A temperature measuring device comprising the combination with the escapement lever of a pendulum clock mechanism, of means responsive to temperature changes for varying the length of the pendulum independently of thermal variations of the pendulum rod.

4. A temperature measuring device comprising the combination with the escapement lever of a clock mechanism of a pendulum engaging said escapement lever of such clock mechanism, said pendulum being suspended from a cam mechanism of varying radii whereby its length is changed in response to angular movement of said cam.

5. A device as set forth in claim 4 in which the cam mechanism is provided with a cylindrical drum which is fixed against rotation by a wire that is secured to the drum and fastened at its extended end, whereby the cam is subjected to angular movement in response to thermal variations in said wire.

6. A device as set forth in claim 4 in which the cam mechanism comprises an integral drum and cam journalled for rotation and having the pendulum rod enveloping the cam surface and a wire enveloping the drum surface, said wire being anchored at its extended end and held under tension by the weight of the pendulum.

In testimony whereof I have hereunto set my hand this 22 day of June, 1929, at Wilkinsburg, Pa.

MARSHALL TAYLOR.